US012746548B2

(12) United States Patent
Huang et al.

(10) Patent No.: US 12,746,548 B2
(45) **Date of Patent: *Sep. 29, 2026**

(54) MICROFLUIDIC PURIFICATION DEVICE

(71) Applicant: ORIENTAL SYSTEM TECHNOLOGY INC., Hsin-Chu (TW)

(72) Inventors: Wen-Chie Huang, Hualien County (TW); Chein-Hsun Wang, Hsin-Chu (TW); Y. H. Chen, Taipei City (TW); Chin-Hsiang Chang, New Taipei City (TW); Jenping Ku, Hsinchu County (TW); Yu-Chih Liang, Hsinchu City (TW)

(73) Assignee: ORIENTAL SYSTEM TECHNOLOGY INC., Hsin-Chu (TW)

( * ) Notice: Subject to any disclaimer, the term of this patent is extended or adjusted under 35 U.S.C. 154(b) by 565 days.

This patent is subject to a terminal disclaimer.

(21) Appl. No.: 18/127,011

(22) Filed: Mar. 28, 2023

(65) Prior Publication Data

US 2024/0326046 A1 Oct. 3, 2024

(51) Int. Cl.

| | |
|---|---|
| ***B01L 3/00*** | (2006.01) |
| ***B01D 35/06*** | (2006.01) |
| ***B01D 35/157*** | (2006.01) |
| ***B01D 35/20*** | (2006.01) |
| ***B01D 39/20*** | (2006.01) |

(Continued)

(52) U.S. Cl.
CPC ........ *B01L 3/502753* (2013.01); *B01D 35/06* (2013.01); *B01D 35/1573* (2013.01); *B01D 35/20* (2013.01); *B01D 39/2068* (2013.01); *B01D 63/088* (2013.01); *B01D 71/0213* (2022.08); *B01D 2313/18* (2013.01); *B01L 2200/0652* (2013.01); *B01L 2300/0681* (2013.01); *B01L 2400/0439* (2013.01)

(58) Field of Classification Search
CPC .. B01D 35/20; B01D 63/16; B01L 2400/0439
See application file for complete search history.

(56) References Cited

U.S. PATENT DOCUMENTS 9,121,526 B2 * 9/2015 Giridhar ............. F16K 99/0025
2010/0078384 A1 * 4/2010 Yang ................ B01L 3/502776
210/243

(Continued)

*Primary Examiner* — Ryan B Huang
(74) *Attorney, Agent, or Firm* — HDLS IPR SERVICES; Chun-Ming Shih

(57) ABSTRACT

A microfluidic purification device for exosomes purification is disclosed that has high speed, high viability and efficiency plus re-cycling of cells for regrowth of exosomes. The microfluidic purification device contains coarse filtering, and/or medium filtering plus fine filter with the medium/fine filter made of MEMS semiconductor process. For high-speed operation, an ultrasound vibrator attached to input chamber/filter/output chamber assembly is also used that the vibration amplitude, duty cycle and duration can be controlled through controller. The MEMS filter is V-shaped and/or funnel shape made of silicon wafer by semiconductor process. For funnel shape MEMS filter, the exit hole size is between 0.2 μm to 1 μm suitable for exosomes filtering with high speed and high viability.

17 Claims, 4 Drawing Sheets

(51) Int. Cl.
*B01D 63/08* (2006.01)
*B01D 71/02* (2006.01)

(56) References Cited

U.S. PATENT DOCUMENTS

| | | | | |
|---|---|---|---|---|
| 2012/0125833 | A1* | 5/2012 | Yagi | B01D 29/72<br>210/388 |
| 2018/0211081 | A1* | 7/2018 | Wang | G06V 40/1306 |
| 2020/0116603 | A1* | 4/2020 | Carter | G01N 1/28 |
| 2022/0104544 | A1* | 4/2022 | Jackson | A24F 40/05 |
| 2023/0174450 | A1* | 6/2023 | Song | B01D 61/00<br>562/584 |

* cited by examiner

MICROFLUIDIC PURIFICATION DEVICE

BACKGROUND

Technical Field

The present invention relates to a microfluidic purification device for concentrating of the exosomes, which is based on an ultrasound vibration and a microfilter made by a MEMS process.

Description of Related Art

There is a general consensus on the substances carried by exosomes, including a large number of growth factors, proteins such as cytokines that regulate immunity and tissue repair, and nucleic acids and other substances. The main function of exosomes is to transmit information and growth repair factors to cells in need, so that cells can repair and regenerate.

The most commonly used purification method for exosomes is ultracentrifugation, but this method is time-consuming and laborious with low recovery. Recently, many alternative methods have been developed to purify exosomes such as ultrafiltration membrane filtration, polyethylene glycol precipitation, immunomagnetic bead purification, and microfluidic purification. Although these methods are time and labor saving, their purification efficiency is low. It has not yet been unanimously affirmed by the public, so the ultra-high-speed centrifugation method is still used as the standard method for mass purification of exosomes.

It is worth noting that the technology based on acoustofluidic purification of exosomes can reach very high removal rate (e.g., >99.9% as reported by literature) which uses surface acoustic wave (SAW) device as acoustic sources and by using acoustic resonance based on particle mass to separate exosomes from cells. Nevertheless, acoustofluidic purification technology is still hard to be used in mass purification of exosomes.

The membrane ultrafiltration technology uses multiple polymer filters to separate exosomes from cells. Due to the particle size of exosomes is between 30 to 150 nm, the final stage membrane filter is disposal type and its purification speed is very low.

Hence there is a need for a high speed, high efficiency and reusable purification device for mass purification of exosomes.

In view of this, the inventors have devoted themselves to the aforementioned related art, researched intensively try to solve the aforementioned problems.

SUMMARY

One objective of the present invention is to provide a microfluidic purification device for purifying the exosomes, which uses the ultrasound vibrator and the Micro-electromechanical system (MEMS) filter for the mass purification of exosomes. A traditional first stage filter may be used as the first stage filtration of impurities.

The advantages of the present invention are: high speed, separation of cells and exosomes with high viability and high efficiency, and the cells may be recycled.

One embodiment of the microfluidic purification device in the present invention includes: a first stage filter, a filter assembly, an ultrasound vibrator, and a controller. The first stage filter receives an input solution and outputs an output solution. The filter assembly receives the output solution from the first stage filter and purifies the output solution into multiple exosomes, and includes: a first inlet valve connected with the first stage filter to receive the output solution: a first input chamber connected with the first inlet valve: a first micro-electromechanical system (MEMS) filter attached to the first input chamber; an output chamber, the first MEMS filter located between the first input chamber and the output chamber; and a first outlet valve connected with the output chamber to collect the exosomes from the output chamber. The ultrasound vibrator is disposed under the filter assembly. The controller is electrically connected with the ultrasound vibrator and controls the ultrasound vibrator to vibrate.

The controller supplies driving power to the ultrasound vibrator (or ultrasound sound generation device) with the capabilities of amplitude, duty cycle and duration control.

By using the MEMS filter and the ultrasound vibrator, the cells and exosomes in the input solution are separated with high speed, and the MEMS filter may be reused as mass purification device. Comparing to the traditional ultrafiltration membrane filtration method, the microfluidic purification device of the invention with the MEMS filter may be regenerated easily.

One embodiment of the MEMS filter of the microfluidic purification devices has a funnel structure which is made of a silicon wafer, and is formed by wet etching and inductively coupled plasma (ICP) etching. The output hole of the funnel structure is precisely controlled by ICP process.

Another embodiment of the MEMS filter of the microfluidic purification devices has a V-shaped cavity, which is coarsely controlled exit window for cell filtering.

In some embodiments, the ultrasound vibrator is made of piezoelectric device, such as the piezoelectric material of polyvinylidene fluoride (PVDF) or lead zirconate titanate (PZT) etc. The ultrasound frequency of ultrasound vibrator is between 20-200 Khz, and desirably is 40 khz.

In some embodiments, two pair of control valves are used for the input chamber and the output chamber, which are used to collect cells and exosomes separately.

In summary, the present invention discloses a microfluidic purification device for exosomes purification with high speed, high viability and high efficiency. The filtration of exosomes is based on multiple stages of filtering, which is using the fine filter of the MEMS filter. The MEMS filter is self-regenerated. One distinctive advantages of the present invention is the cells may be re-collected for further growing the exosomes.

It is worth mentioning that, in some embodiments, in order to improve purification speed and efficiency, an ultrasound vibrator is used for speeding up the process and regeneration of the fine filter (the MEMS filter).

Therefore, comparing with the related art of ultrafiltration membrane filtration, the present invention has the advantage of high speed, and the fine filter may be regenerated easily with the help of ultrasound vibrator.

BRIEF DESCRIPTION OF THE DRAWINGS

In order to further understand the techniques, means, and effects of the present invention for achieving the intended object. Please refer to the following detailed description and drawings of the present invention. The drawings are provided for reference and description only, and are not intended to limit the present invention.

DETAILED DESCRIPTION

The following are specific examples to illustrate some implementations of the present invention. A person skilled in the art may understand the advantages and effects of the present invention from the content disclosed in this specification. The present invention may be implemented or applied through other different specific embodiments, and various details in this specification may also be based on different viewpoints and applications, and various modifications and changes may be made without departing from the concept of the present invention.

The technical content and detailed description of the present invention are described below with the drawings.

Figure 1:
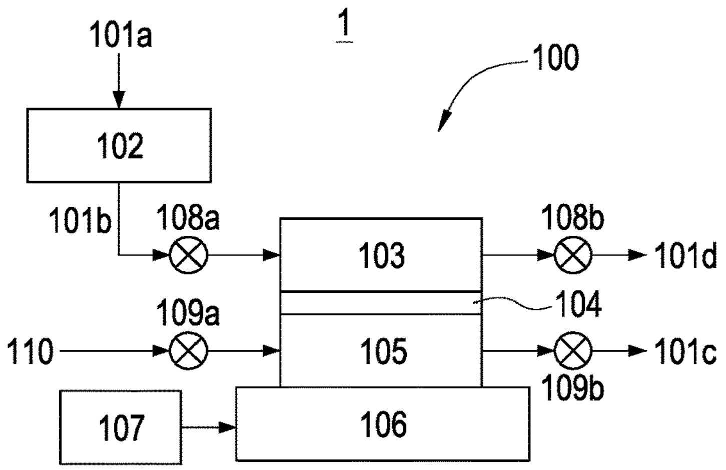
FIG. 1 is a block diagram of the first embodiment of a microfluidic purification device of the present invention.

FIG. 1 is a block diagram of the first embodiment of a microfluidic purification device 1 of the present invention. The microfluidic purification device 1 includes a first stage filter 102, a filter assembly 100, an ultrasound vibrator 106, and a controller 107.

The first stage filter 102 receives an input solution 101*a* and outputs an output solution 101*b*. The input solution 101*a* is the mixture solution of cells and exosomes. The first stage filter 102 may use conventional polymer membrane for filtering out impurities or big particles, and cells and exosomes may pass through as the output solution 101*b*.

The filter assembly 100 receives the output solution 101*b* from the first stage filter 102 and purifies the output solution 101*b* into multiple exosomes 101*c*. The filter assembly 100 includes an inlet valve 108*a*, an input chamber 103, a micro-electromechanical system (MEMS) filter 104, an output chamber 105, and an outlet valve 109*b*.

The inlet valve 108*a* is connected with the first stage filter 102 to receive the output solution 101*b*. The inlet valve 108*a* is the inlet with controlled valve, and passes the mixture fluid (the input solution 101*a*) from first stage filter 102 to input chamber 103. In some embodiment, the filter assembly 100 may further include an outlet valve 108*b*. The outlet valve 108*b* is connected with the input chamber 103, and pumps out multiple cells 101*d* of the output solution 101*b*. The outlet valve 108*b* is the outlet with controlled valve to drain out cells 101*d* after purification process.

The input chamber 103 is connected with the inlet valve 108*a* and the outlet valve 108*b*. In some embodiments, the input chamber 103 may optionally have an air exit hole disposed on the top thereof.

The MEMS filter 104 is located and attached between the input chamber 103 and the output chamber 105.

The output chamber 105 is attached to the MEMS filter 104. The outlet valve 109*b* is connected with the output chamber 105 to collect the exosomes 101*c* from the output chamber 105. In some embodiment, the filter assembly 100 may further include an inlet valve 109*a*. The inlet valve 109*a* is connected with the output chamber 105, and used to drain out the exosomes 101*c*.

The ultrasound vibrator 106 is disposed under the filter assembly 100. Both the input chamber 103, the MEMS filter 104 and the output chamber 105 are attached to the ultrasound vibrator 106. The ultrasound vibrator 106 generates ultrasound vibration for the mixture fluid (the output solution 101*b*). The ultrasound vibrator 106 may be made of piezoelectric device, which converts electric drive to mechanical motion. The piezoelectric material such as polyvinylidene fluoride (PVDF) or PZT lead zirconate titanate etc. may be used for the ultrasound vibrator 106. Desirably, the material of PZT, which is operable between a frequency range of 20 Khz to 200 Khz and in a desirable frequency of 40 Khz, is used.

The controller 107 is electrically connected with the ultrasound vibrator 106 and controls the ultrasound vibrator 106 to vibrate. In some embodiment, the controller 107 may control the valves 108*a*, 108*b*, 109*a*, 109*b*, and the ultrasound vibrator 106. The controller 107 may generate high frequency pulse trains, and control the duty cycle, duration and/or amplitude of the ultrasound vibrator 106. It is worth mentioning that, by using ultrasound vibration, the turbulence of fluid may be created, such that the exosomes may jump around with a good chance to pass through the MEMS filter 104 from input chamber 103 to output chamber 105, when the ultrasound vibration is terminated. Further, by using ultrasound vibration, the filtering of the exosomes is non-destructive, and high viability and efficiency of exosomes purification may be obtained.

Hereafter describes two cases of controlling the microfluidic purification device 1 as examples, here is not intended to be limiting.

Case 1: Continuous Purification Process

The initial setting of controlling the valves is that the input valve 108*a* is set to be ON state, and the output valve 108*b*, the input valve 109*a*, and the output valve 109*b* are set to be OFF state. The mixture solution (input solution 101*a*) passes through the first stage filter 102 (coarse filter) and is filtered by the first stage filter 102 to be the output solution 101*b*. The output solution 101*b* is continuously provided to the input chamber 103. After the input chamber 103 is filled up, the input valve 108*a* is switched to OFF state, and the ultrasound vibrator 106 begins to be operated intermittently. When the ultrasound vibration from the ultrasound vibrator 106 is stopped, the exosomes and cells may drop to the MEMS filter 104, and the exosomes may pass through the MEMS filter 104 to the output chamber 105.

It should be noted that the ultrasound vibration operation of the ultrasound vibrator 106 may be repeated until most of the exosomes are captured in the output chamber 105. Then, the output valve 109*b* is set to be ON state to drain out the exosomes with solution, and the cells 101*d* are kept at the input chamber 103. In some embodiment, in order to increase the efficiency of draining out the exosomes from the output chamber 103, a solution 110 may be input from the input valve 109*a*, here is not intended to be limiting.

Further, after multiple times of operation, the cells may need to be pushed out from the input chamber 103 with a process as below. In the process, the input valve 109*a* and the output valve 109*b* are set to be OFF state, the input valve 108*a* and the output valve 108*b* are set to be ON state, and a solution is fed to the first stage filter 102 and passes through input valve 108*a* to push out the cells 101*d* in the input chamber 103. In some embodiment, the ultrasound vibrator 106 may be also set to be operated intermittently to make the cells 101*d* exit from the input chamber 103 and be drained out through the output valve 108*b* efficiently.

Case 2: One Time Operation

If the volume of the input mixture solution (input solution 101*a*) is less than the volume of the input chamber 103 plus the output chamber 105, the input valve 108*a* is set to be ON state, and the output valve 108*b*, the input valve 109*a*, and the output valve 109*b* are set to be OFF state. The mixture solution passes through the first state filter (coarse filter) 102, the input chamber 103, the MEMS filter 104 to the out chamber 105.

If the volume of the mixture solution less than the volume of output chamber 105 plus half volume of the input chamber 103, some solution is added to the mixture solution. After that, the ultrasound vibrator 106 is activated intermittently, such that the exosomes may flow into the output chamber 105. Finally, the output valve 109*b* is set to be ON state to drain out the exosomes 101*c* with solution.

The last stage is the contraction process of the exosomes. The freeze-drying method may be applied, here is not intended to be limiting. The freeze-drying method is based on gradual extraction of water vapor from solution by freezing air method.

Figure 2A:
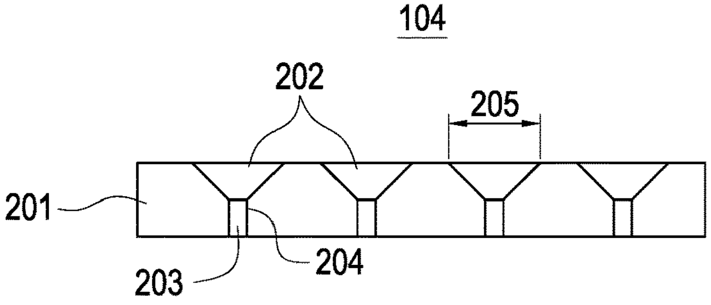
FIG. 2A is the side view of one example of the MEMS filter of the present invention.
Figure 2B:
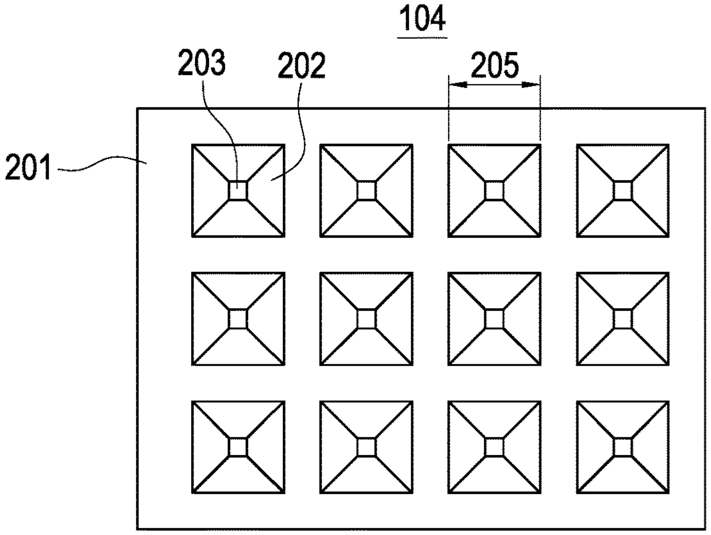
FIG. 2B is the top view of one example of the MEMS filter of the present invention.

FIG. 2A is the side view of one example of the MEMS filter 104 of the present invention. FIG. 2B is the top view of one example of the MEMS filter 104 of the present invention. As illustrated in FIG. 2A and FIG. 2B, one embodiment of the MEMS filter 104 is designed to collect the exosomes through the funnel structure, which has funnel shape micro-holes, and an output hole 203 of the funnel structure is smaller than an input hole 202 of the funnel structure. The MEMS filter 104 is made of a silicon wafer 201 through semiconductor process. By photolithography and wet etching process, multiple funnel shape of input holes (cavities) 202 are formed on the silicon wafer 201. The output holes (bottom exit holes) 203 are made by ICP etching or dry etching. In some embodiments, the output hole 203 has the diameter of 0.2 μm to 1 μm, and the diameter 205 of the input hole 202 (funnel top opening, or cavity) is 20 μm to 100 μm. The walls 204 of the funnel structure are formed with a narrow neck only for the exosomes to pass through. If the exosomes fall into the input holes 202 by gravity after the ultrasound vibration, the V-shaped cavity of the funnel structure may lead the exosomes to drop to the neck of the funnel structure, and the exosomes may exit from the output hole 203 to the output chamber 105 (shown in FIG. 1) for exosomes collection. By using the V-shaped cavity, the exosomes may efficiently pass through narrow neck to the output hole 203, and the collection efficiency of the exosomes may be greatly improved.

FIG. 3A to FIG. 3H are the manufacturing process of one embodiment of the MEMS filter 104 with fine output hole 203 of the present invention. The manufacture process of the MEMS filter is made by micro machining of silicon wafer 201 as substrate through semiconductor process as shown in FIG. 3A to FIG. 3H. FIG. 3A to FIG. 3H illustrates the manufacturing process of one embodiment of the MEMS filter with funnel structure that has better dimension control of diameter of the output hole 203. It should be noted that in FIG. 3A to FIG. 3H only one funnel structure is illustrated as an example, but the silicon wafer 201 may be formed with multiple funnel structures with the same process. In reality, multiple funnel structures within the same silicon wafer 201 may be fabricated simultaneously and cost effectively.

Figure 3A:
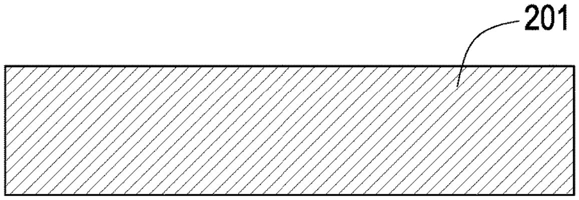
FIG. 3A to FIG. 3H are the manufacturing process of one embodiment of the MEMS filter with fine output hole of the present invention.
Figure 3B:
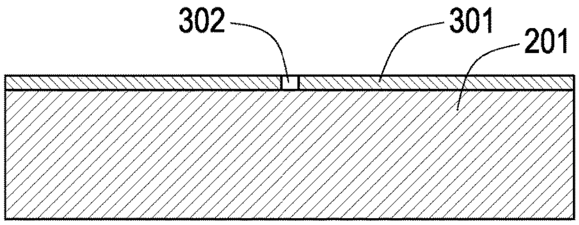
Figure 3C:
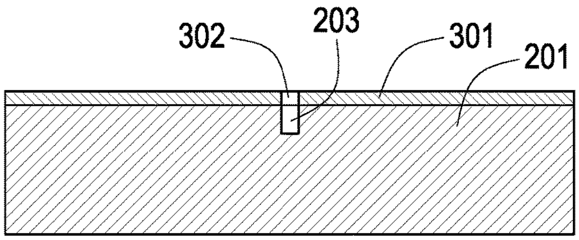
Figure 3D:
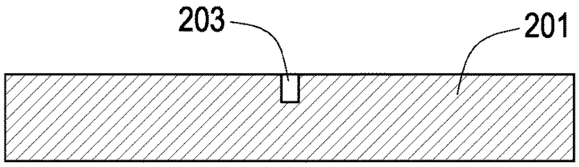
Figure 3E:
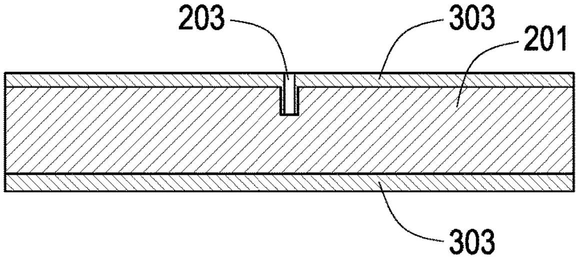
Figure 3F:
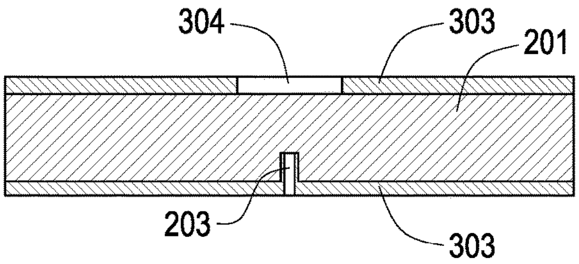
Figure 3G:
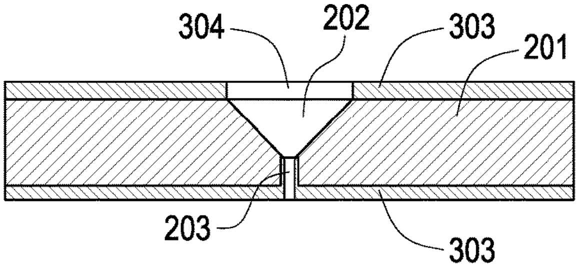
Figure 3H:
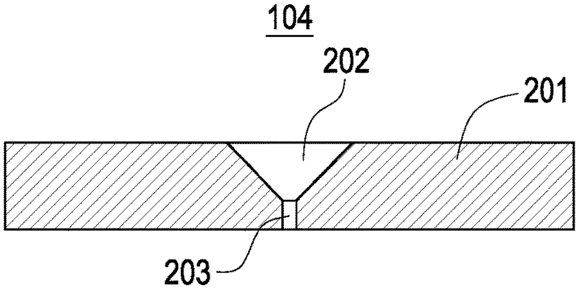

In FIG. 3A, the silicon wafer 201 provided as the silicon substrate. The silicon wafer 201 may be 6 inches to 12 inches in diameter. In FIG. 3B, by using photolithography, the metal mask layer 301 is formed on the silicon wafer 201 for defining the area 302 of the output hole by dry etching or ICP etching. In FIG. 3C, the output hole (exit hole) 203 is formed after dry etching with the metal mask layer 301. In FIG. 3D, the metal mask layer (dry etching protection layer) 301 is removed, the silicon wafer 201 is thinned down in thickness by, for example, mechanical grinding plus polishing. In FIG. 3E, the protection layers 303 are re-grown on both sides of the silicon wafer 201. The material of the protection layer 303 may be, for example, silicon dioxide ($SiO_2$) or silicon nitride (SiN), or the combination of the two. It should be noted that the bottom wall of the output hole 203 has to be free from the protection layer 303. In other words, no protection layer 303 is disposed on the bottom wall of the output hole 203. In FIG. 3F, the silicon wafer 201 is flipped upside down, and then the cavity opening 304 is created by photolithography on the protection layer 303 opposite to the output hole 203. In FIG. 3G, the V-shaped cavity of the input hole 202 is created by the wet etching process with the protection layer 303. In FIG. 3H, the protection layer 303 is removed. It should be noted that the removal of the protection layer 303 is optional.

It is worth mentioning that, in order to make the output hole 203 in the cavity tip of the input hole 202, the silicon wafer 201 is desirably to be thinned down to about 100 μm to about 300 μm in thickness. The reason is that the cavity angle is about 70.6° after wet etching process. The larger diameter 205 (shown in FIG. 2A and FIG. 2B) of the cavity opening, the thicker of the silicon wafer 201 may be used.

For example, the diameter 205 of 100 μm may be structured with a V-shaped cavity tip thickness of 70 μm. If the thickness of the silicon wafer 201 is more than 70 μm, the tip of the output hole 203 may not be made by single etching process. In FIG. 3B to FIG. 3D show the pattering in back side of the silicon wafer 201, and uses ICP etching or dry etching process to create a smaller vertical hole beneath the tip of V-shaped cavity. Generally, the ICP etching process may make a hole with the depth/hole ratio of 10:1 to 20:1. If the output hole 203 is set to be 1 μm in diameter, the ICP is used to create a hole with depth of 10 μm at least. Before wet etching process in FIG. 3G is started on top layer, the protection layer 303 needs to be coated on both sides of the silicon wafer 201 as shown in FIG. 3E and FIG. 3F.

As shown in FIG. 3A to FIG. 3H, the thickness of the silicon wafer 201 is mainly determined by the diameter 205 of the cavity opening. The depth of the output hole 203 is determined by the hole diameter and the depth/hole ratio in the semiconductor process, which is generally limited to 20:1.

FIG. 4A to FIG. 4D are the manufacturing process of another embodiment of the MEMS filter 104*a* with coarse output hole of the present invention. In the FIG. 4A, the silicon wafer 201 is provided for manufacturing the MEMS filter. In the FIG. 4B, the protection layer 303 (the material is, for example, $SiO_2$ and/or SiN) is grown on the top of the silicon wafer 201, and the cavity opening 304 is formed by photolithography. In the FIG. 4C, the silicon wafer 201 is thinned down to the specific thickness depending on the size of cavity opening 304. In the FIG. 4D, the V-shaped cavity of the input hole 202 is formed by the wet etching. The tip of the V-shaped cavity is opened as the output hole 203.

Figure 4A:
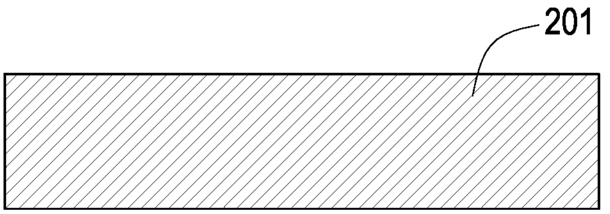
FIG. 4A to FIG. 4D are the manufacturing process of another embodiment of the MEMS filter with coarse output hole of the present invention.
Figure 4B:
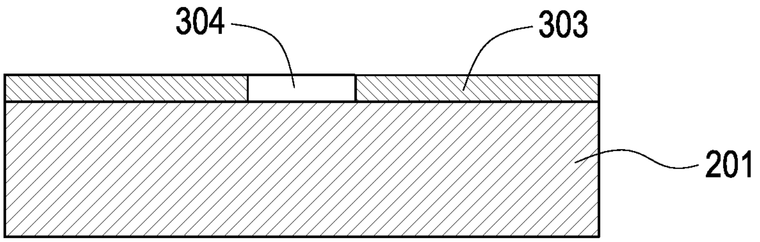
Figure 4C:
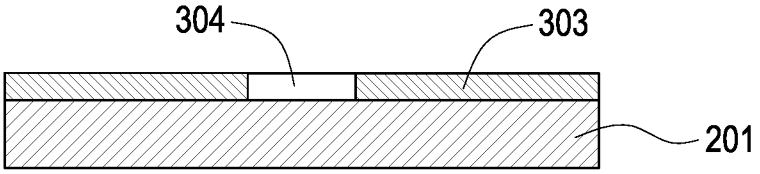
Figure 4D:
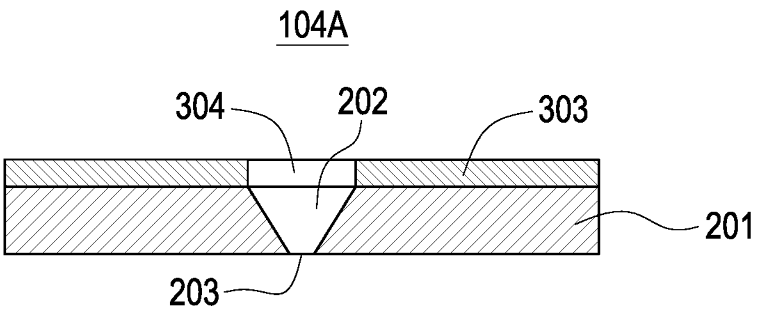

The accuracy of thinning the silicon wafer 201 is about 5 μm, thereby the tolerance of the output hole 203 being within 7 μm. Therefore, the MEMS filter 104*a* depicted in FIG. 4D is suitable for the manufacturing process of coarse and/or medium size filter. In order to acquire the output hole 203 with small size in FIG. 4D, the wet etching process may be inspected from time to time to obtain suitable size of the output hole 203. The MEMS filter 104*a* is capable of regenerated and non-consumable, and the MEMS filter 104*a* may be fine-tuned carefully during the fabrication process.

Referring back to FIG. 1, in some embodiments, the MEMS filter 104 is attached to the input chamber 103, and the input chamber 103 may be removed from top. After the filtering process is done, the input chamber 103 contains the concentrated cells that can be re-cycled to re-grow the exosomes. The output chamber 105 is also removable from ultrasound vibrator 106.

In some embodiment, the volume of the output chamber 105 is designed to be smaller than the volume of the input chamber 103, such that the exosomes may be concentrated in the output chamber 105. In this case, the output chamber 105 contains the concentrated exosomes that may be collected as final product. As a result, the concentrated exosomes are easier to be dried out into powder form with high viability.

Figure 5:
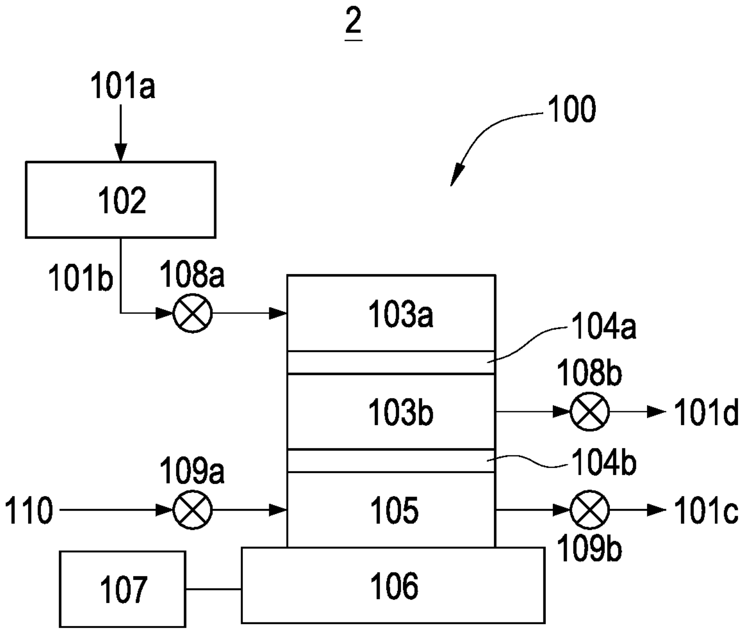
FIG. 5 is a block diagram of the second embodiment of a microfluidic purification device with precise cell collection of the present invention.

FIG. 5 is a block diagram of the second embodiment of a microfluidic purification device 2 with precise cell collection of the present invention.

The microfluidic purification device 2 includes multiple MEMS filters 104*a*, 104*b* arranged in a cascaded manner as illustrated in FIG. 5. The MEMS filter 104*a* is a medium size filter and designed to collect the cells being captured in the output chamber 103*b* from the input chamber 103*a*. For example, the output hole of the MEMS filter 104*a* may be set to filter out cells plus exosomes only (for example, 10 μm to 50 μm in diameter). On the other hand, the MEMS filter 104*b* is a fine filter (for example, 0.2 μm to 1 μm in diameter) that is used for the exosomes to pass through and enter the output chamber 105.

In summary, comparing to the related art, the microfluidic purification device of the present invention uses the coarse filter, the MEMS medium/fine filter, and the ultrasound vibrator to achieve the function of high speed, high viability and high efficiency filtration for exosomes. The MEMS filter is made by semiconductor process with V-shaped cavity or funnel structure to separate cells and exosomes. Moreover, the ultrasound vibrator may be operated intermittently to speed up the filtration process. Further, the microfluidic purification device of the present invention may recycle the cells and the MEMS filters.

The above is only a detailed description and drawings of the preferred embodiments of the present invention, but the features of the present invention are not limited thereto, and are not intended to limit the present invention. All the scope of the present invention shall be subjected to the scope of the following claims. The embodiments of the spirit of the present invention and its similar variations are intended to be included in the scope of the present invention. Any variation or modification that may be easily conceived by those skilled in the art and in the field of the present invention may be covered by the following claims.

What is claimed is:

1. A microfluidic purification device, comprising:

a first stage filter, configured to receive an input solution and output an output solution;

a filter assembly, configured to receive the output solution from the first stage filter and purify the output solution into multiple exosomes, and comprising:

a first inlet valve, connected with the first stage filter;

a first input chamber, connected with the first inlet valve;

a first micro-electromechanical system (MEMS) filter, attached to the first input chamber;

an output chamber, the first MEMS filter located between the first input chamber and the output chamber; and a first outlet valve, connected with the output chamber;

an ultrasound vibrator, disposed under the filter assembly; and a controller, electrically connected with the ultrasound vibrator, the first inlet valve, and the first outlet valve, wherein the controller is configured to control the ultrasound vibrator to perform an intermittent vibration operation and to independently switch the first inlet valve and the first outlet valve between an open state and a closed state;

wherein the first MEMS filter comprises a funnel structure, and an output hole of the funnel structure is smaller than an input hole of the funnel structure;

wherein the input hole is arranged at a position closer to the first input chamber than the output chamber, the output hole is arranged at a position closer to the output chamber than the first input chamber;

wherein a size of the output hole is larger than sizes of the multiple exosomes;

wherein the output hole has a constant first diameter, and the input hole has a V-shaped cross-section with a second diameter that gradually increases from a junction with the output hole toward the first input chamber; and wherein the controller is configured such that:

the output solution enters the first input chamber while the first inlet valve is in the open state and the first outlet valve is in the closed state;

the first inlet valve transition from the open state to the closed state upon the first input chamber being filled;

the ultrasound vibrator performs the intermittent vibration operation while both the first inlet valve and the first outlet valve are in the closed state; and after completion of the intermittent vibration operation, the first outlet valve transitions from the close state to the open state to drain out the exosomes.

2. The microfluidic purification device of claim 1, wherein a diameter of the output hole is greater than or equal to 0.2 μm and less than or equal to 1 μm.

3. The microfluidic purification device of claim 1, wherein the first MEMS filter is made of a silicon wafer.

4. The microfluidic purification device of claim 1, wherein the filter assembly further comprises:

a second outlet valve, connected with the first input chamber, and configured to pump out multiple cells of the output solution.

5. The microfluidic purification device of claim 1, wherein the filter assembly further comprises:

a second inlet valve, connected with the output chamber, and configured to drain out the multiple exosomes.

6. The microfluidic purification device of claim 1, wherein the controller is configured to drive an amplitude, a duty cycle and/or a duration control of the ultrasound vibrator.

7. The microfluidic purification device of claim 1, wherein the first input chamber and the first MEMS filter are detachable from the filter assembly for collecting multiple cells of the output solution.

8. The microfluidic purification device of claim 1, wherein the output chamber is detachable from the filter assembly for concentrating the multiple exosomes.

9. The microfluidic purification device of claim 1, wherein a volume of the output chamber is smaller than a volume of the first input chamber.

10. The microfluidic purification device of claim 1, wherein the filter assembly further comprises:

a second input chamber, attached to the first MEMS filter; and a second MEMS filter, attached to the second input chamber and the output chamber.

11. The microfluidic purification device of claim 10, wherein a diameter of an output hole of the second MEMS filter is greater than or equal to 10 μm and less than or equal to 50 μm.

12. The microfluidic purification device of claim 10, wherein the second MEMS filter comprises a V-shaped cavity.

13. The microfluidic purification device of claim 1, wherein the ultrasound vibrator is made of a piezoelectric material.

14. The microfluidic purification device of claim 13, wherein the piezoelectric material is lead zirconate titanate (PZT).

15. The microfluidic purification device of claim 13, wherein the ultrasound vibrator is configured to operate intermittently with a frequency in a range of greater than or equal to 20 KHz and less than or equal to 200 KHz.

16. The microfluidic purification device of claim 15, wherein the frequency is 40 KHz.

17. The microfluidic purification device of claim 1, wherein the first MEMS filter comprises a V-shaped cavity made by a wet etching process.

* * * * *